Patented Mar. 3, 1936

2,032,704

UNITED STATES PATENT OFFICE 2,032,704

COSMETIC CREAM

Howard A. Kiernan, New York, N. Y.

No Drawing. Application November 19, 1934,
Serial No. 753,787

7 Claims. (Cl. 167—91)

My invention relates to cosmetic preparations, and comprises more particularly a novel face cream and a novel method of making the same.

This application is a continuation in part of my copending application Serial No. 711,817, Cosmetic cream, filed in the United States Patent Office February 17, 1934, the latter application having been copending with and a continuation in part of my application Serial No. 669,787, Process of manufacturing cosmetics, filed in the United States Patent Office May 6, 1933.

The primary object of the present invention is to provide a cosmetic preparation of the face cream type having certain advantages and superiorities over previously known preparations of this class. The invention comprises also a novel process of manufacturing the new product. The important advantages and differences from the prior art inherent in my new product can best be explained by a brief general description of the usual prior art face creams and the methods by which they are made.

Heretofore most face creams and cosmetic preparations generally of the class to which my invention belongs have been soaps, emulsions, or unsaponified, unmulsified ointments.

The soap creams are made in a well understood manner, including a fatty acid or a fatty acid derivative saponified by an alkali. These creams are objectionable, since they invariably have either an acid or an alkaline reaction, the former tending to burn the skin and the latter tending to dry it. An object of the present invention is to provide a face cream which is entirely devoid of acid or alkaline ingredients, or which shows no acid or alkaline reaction.

The emulsion creams comprise essentially fats or oils emulsified in water. While water has no injurious effect on the skin it constitutes only a filler in the nature of an adulterant of the cream which contains it.

Obviously the water content of an emulsion cream is inert, and to the extent that such a cream contains water it lacks the desirable active properties and capacities for which the cream is intended and for which the purchaser pays. It is evident that a cream otherwise satisfactory which contains no water is superior to a cream containing the same active ingredients plus water and it is accordingly an object of the present invention to provide a cream substantially devoid of water or containing only cosmetically useful or dermatologically active ingredients.

Face creams of the ointment type, so far as they have been known prior to my present invention, have included certain oleaginous foundations mixed together with a congealing agent, i. e., a substance adapted to bond the ingredients together and render the combination semi-solid or creamy in consistency. Such bonding or congealing agents as beeswax, paraffin and equivalent waxy substances have been used. In a face cream these materials are objectionable because they have no cleansing or emollient function and thus add nothing to the cosmetic efficiency of the cream and more especially because their solidifying temperatures are so high that they are solid and quite hard at normal body temperatures. It results that these waxy ingredients of such prior face creams liquefy under the friction of rubbing or massaging the cream on the skin, entering the pores and subsequently solidifying therein, so that in the course of time and after repeated applications enlargement of the pores results.

An object of the present invention is to provide a face cream devoid of these congealing or bonding ingredients and consisting exclusively of substances having cleansing, emollient and other desirable functions only. In lieu of using an ingredient material to effect the necessary bonding between the cosmetic materials, I employ a novel process step which effects the desired combination of materials and assures the stability of the bond. It is to be understood of course that the relatively minute quantities of scenting essences, tinting materials and the like may be included in the cream if desired, according to standard practice.

The several objectionable ingredients discussed above have been included in greater or less proportions in all prior cosmetic compositions with which I am acquainted because it was considered impossible to produce a cream having the desired consistency, cleansing, emollient and vanishing characteristics without including some or all of the objectionable substances. By the present invention I provide a new method resulting in a new cream containing, apart from the usual small quantity of scenting, coloring and the like, nothing but active and harmless materials intimately are permanently bonded as a cream of desirable consistency.

My invention comprises the combination of an oil and a fat intimately and permanently bonded as a light, fluffy, and smooth cream. The composition need contain no other ingredients, in this respect differing from all prior art creams of which I am aware, since all prior creams contain one or more of the objectionable, cosmetically harmful or useless ingredients discussed hereinabove.

The oil which I use may be any one or more of a relatively large number of cosmetically useful oils, including liquid petrolatum, olive oil, and in general practically all of the edible vegetable oils. These oils are well known to cosmetic manufacturers and their usefuness in the manufacture of cosmetics is well understood.

The fat which I use is preferably prime stearine, but I may also use stearic acid or spermaceti. Any of these three materials may be used alone as the fat ingredient, or combinations of them may be used. Their function in the composition is to render less fluid the oil ingredient, producing a combination of ingredients which is not liquid, and not substantially solid, being rather a semi-solid of the well known creamy consistency of good face cream.

The foregoing materials have been used heretofore in the compounding of cosmetics, but so far as I know prior to my present invention no cosmetic has contained these materials exclusively, or substantially exclusively, aside from scenting or tinting agencies and the like, or relatively small quantities of other substances for special purposes as hereinafter explained.

I prefer to use in my cosmetic cream liquid petrolatum as the oil ingredient and prime stearine as the fat component. These two ingredients are typical of the alternative materials named above, and will hereinafter be used in this specification to explain a preferred and representative embodiment of the invention. It will be understood that any of the oils listed above may be substituted for liquid petrolatum, and any of the fats named above may be substituted for the prime stearine.

I have found that while a mixture solely of liquid petrolatum and prime stearin would constitute an excellent cosmetic these two materials cannot be readily compounded to provide a preparation which will remain a cream of proper consistency under the wide range of temperatures which prepared creams must withstand in warehouses, retail stores, the home, etc. Thus, when these two ingredients are reduced to fluidity and are thoroughly mixed and allowed to cool naturally the product is an oily body of insufficient viscosity and insufficient whiteness, closely resembling in color and greasiness plain white petroleum jelly but being considerably more fluid. A preparation having these physical properties is utterly unsuitable for use as a facial cream, since to be functionally and commercially successful facial cream must be naturally pure white, relatively greaseless, and of a creamy consistency.

I have discovered that liquid petrolatum and prime stearine may be combined exclusively of other materials by a certain novel process which I have invented which produces in the compound all the desired physical properties. Briefly, the novel method comprises reducing the two ingredients to fluidity and intimately mixing them together while the mixture is artificially cooled so that its temperature becomes lower somewhat faster than would be the case if no positive refrigerating step were employed.

Specifically I mix the fluid ingredients in a container which is surrounded by a cooling jacket in which circulates brine, cold water or the like, or which may contain ice. The mixture becomes reduced in this vessel to a temperature somewhat lower than customary room temperatures, but the specific end temperature appears to be of less importance than the rate at which the end temperature is attained. In other words, the success of the method appears to depend principally upon cooling the associated ingredients faster than they would be cooled if no refrigerating means were employed.

A specific formula and a specific mode of practicing the process comprises mixing together materials in the proportions of 3 to 10 parts by volume of liquid petrolatum and 1 part prime stearine or equivalent oleagenous material. The stearine is heated until it reaches a temperature of approximately 190° to 212° F., after which it is preferably thoroughly strained. The fluid stearine and the liquid petrolatum, the latter at room temperature, are then charged into a vessel provided with rotary paddles or any other means for mixing or beating the materials together, and having surrounding cooling jackets. The mixture is thus simultaneously mixed and artificially cooled. The initial temperature of the mixture may be from 70° to 110° F., depending on the proportions and initial temperatures of the petrolatum and stearine. The vessel containing the ingredients is closed to the outer atmosphere and the refrigerant in the jacket is kept between 14° and 45° F. The mixture is simultaneously mixed and cooled for 13 to 30 minutes, depending upon the factors noted above, the room temperature, and the relative humidity of the atmosphere. The contents of the vessel are removed when they have attained the desired consistency, commonly at a temperature of 40° to 60° F., and may be immediately run into jars, collapsible tubes or the like. The composition will remain at substantially the consistency attained by the simultaneous mixing and cooling operations through the wide range of temperatures encountered during the normal course of distribution to the ultimate consumer.

Such auxiliary ingredients as scenting and tinting agencies may be added at any time during practice of the method.

It will be understood that my invention comprises essentially a cream formed exclusively of a cosmetically useful oil, as defined hereinabove, and an animal fat of the group consisting of stearine, stearic acid and spermaceti, the solid ingredients being warmed to fluidity, and the several ingredients being mixed and simultaneously artificially cooled. The combination of petrolatum and stearine provides a cream without acid or alkaline reaction. Stearic acid is mildly acid in reaction, and if a neutral cream made with this material is desired a neutralizing agency like triethanolamine may be added to the mixture during its compounding. The proportions in which the triethanolamine should be used will depend of course on the relative amount of stearic acid used, and these proportions can best be arrived at by experiment. Spermaceti is generally neutral in its reaction, but where it shows slight acidity, it too may be neutralized by triethanolamine or an equivalent base.

It will be appreciated that the foregoing explanation of the invention is given merely by way of exemplification and not limitation, and that changes may be made in the proportions of ingredients, temperatures and time periods involved in practicing the method, and it will be understood also that equivalents may be substituted for the ingredients which I have named and prefer to use. All such modifications, to the extent that they embody the broad principles of the invention as pointed out in the appended claims, are deemed to be within the scope and purview thereof.

I claim:

1. An unsaponified, unemulsified face cream comprising the product formed by the process of intimately mixing a cosmetically useful oil and a substance from the group consisting of prime stearine, stearic acid and spermaceti and subjecting the ingredients while mixing them to a cooling medium kept at lower than room temperature, the ingredients being combined in proportions to produce a product having cosmetic cream consistency within the usual range of atmospheric temperatures.

2. A cosmetic preparation comprising the product resulting from the process of intimately mixing prime stearine and liquid petrolatum and simultaneously subjecting the mixture to a cooling medium kept at lower than room temperature.

3. A cosmetic preparation comprising the product resulting from the process of intimately mixing liquid petrolatum and prime stearine in the proportions of three to ten parts by volume of liquid petrolatum and one part of prime stearine and simultaneously subjecting the mixture to a cooling medium kept at lower than room temperature.

4. The method of making a face cream which comprises intimately mixing a cosmetically useful oil and a substance from the group consisting of prime stearine, stearic acid and spermaceti and subjecting the ingredients while mixing them to a cooling medium kept at lower than room temperature, the ingredients being combined in proportions to produce a product having cosmetic cream consistency within the usual range of atmospheric temperatures.

5. The method of making a cosmetic preparation which comprises mixing together prime stearine and liquid petrolatum and simultaneously subjecting the mixture to a cooling medium kept at lower than room temperature.

6. The method of making a cosmetic preparation which comprises mixing together liquid petrolatum and prime stearine in the proportions of three to ten parts by volume of liquid petrolatum and one part of prime stearine and simultaneously subjecting the mixture to a cooling medium kept at lower than room temperature.

7. The method of making a cosmetic preparation which comprises mixing together liquid petrolatum at substantially room temperature and prime stearine at a temperature of 190° to 212° F., and while mixing subjecting the mixture to a cooling medium kept at lower than room temperature until it reaches the consistency of facial cream.

HOWARD A. KIERNAN.